(12) United States Patent
Marupaduga et al.

(10) Patent No.: US 10,531,457 B1
(45) Date of Patent: Jan. 7, 2020

(54) WIRELESS ACCESS POINT CONTROL OVER CARRIER AGGREGATION (CA) THROUGH A WIRELESS REPEATER CHAIN

(71) Applicant: Sprint Communications Company L.P., Overland Park, KS (US)

(72) Inventors: Sreekar Marupaduga, Overland Park, KS (US); John W. Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 179 days.

(21) Appl. No.: 15/416,364

(22) Filed: Jan. 26, 2017

(51) Int. Cl.
  *H04W 72/04* (2009.01)
  *H04B 7/15* (2006.01)

(52) U.S. Cl.
  CPC .......... *H04W 72/0453* (2013.01); *H04B 7/15* (2013.01)

(58) Field of Classification Search
  None
  See application file for complete search history.

(56) References Cited

U.S. PATENT DOCUMENTS

| | | | | |
|---|---|---|---|---|
| 8,649,418 B1* | 2/2014 | Negus | ................... | H04B 7/0486 375/211 |
| 8,964,645 B2* | 2/2015 | Kwon | ................... | H04W 56/00 370/328 |
| 9,107,084 B2* | 8/2015 | Siomina | ................ | H04W 24/00 |
| 9,179,325 B2* | 11/2015 | Yuan | ...................... | H04L 5/0053 |
| 9,999,052 B1* | 6/2018 | Marupaduga | ..... | H04W 72/0453 |
| 2012/0182931 A1* | 7/2012 | Shen | ...................... | H04L 5/0053 370/315 |
| 2013/0010684 A1* | 1/2013 | Park | ...................... | H04L 5/0003 370/315 |
| 2013/0336201 A1* | 12/2013 | Nishio | .................. | H04W 16/26 370/315 |
| 2014/0003326 A1* | 1/2014 | Nishio | .................. | H04W 16/26 370/315 |
| 2015/0098532 A1* | 4/2015 | Ryu | ........................ | H04L 5/001 375/347 |
| 2015/0222410 A1* | 8/2015 | Belghoul | ............ | H04W 28/085 370/252 |
| 2015/0245337 A1* | 8/2015 | Park | .................. | H04W 72/0406 370/329 |
| 2016/0007310 A1* | 1/2016 | Yi | ..................... | H04W 56/0015 370/338 |
| 2016/0065302 A1* | 3/2016 | Rosa | .................... | H04B 7/2615 370/330 |
| 2016/0192304 A1* | 6/2016 | Yi | ........................ | H04B 7/2656 370/311 |
| 2016/0295496 A1* | 10/2016 | Atarius | ................. | H04W 76/14 |

(Continued)

*Primary Examiner* — Gregory B Sefcheck
*Assistant Examiner* — Suk Jin Kang

(57) ABSTRACT

A wireless access point to control Carrier Aggregation (CA) over a wireless repeater chain. The wireless access point wirelessly exchanges network signaling with User Equipment (UE) over the wireless repeater chain using a number of repeater hops. The wireless access point processes the number of repeater hops to select a radio frequency for a CA Primary Component Carrier (PCC) and to select an amount of CA Secondary Component Carriers (SCCs) for the UE. The wireless access point wirelessly exchanges user data with the UE over the wireless repeater chain using the selected radio frequency for the CA PCC and using the selected amount of the CA SCCs.

18 Claims, 7 Drawing Sheets

(56) References Cited

U.S. PATENT DOCUMENTS

| | | | | |
|---|---|---|---|---|
| 2016/0337889 A1* | 11/2016 | Jung | .................... | H04W 24/04 |
| 2016/0353307 A1* | 12/2016 | Jung | .................... | H04W 8/005 |
| 2016/0353397 A1* | 12/2016 | Jung | .................. | H04W 56/001 |
| 2017/0019778 A1* | 1/2017 | Jung | .................... | H04W 72/02 |
| 2017/0034799 A1* | 2/2017 | Kim | .................... | H04W 56/00 |
| 2017/0078863 A1* | 3/2017 | Kim | .................... | H04W 48/16 |
| 2017/0230893 A1* | 8/2017 | Miao | .................. | H04B 7/15542 |
| 2017/0317740 A1* | 11/2017 | Basu Mallick | .... | H04B 7/15557 |
| 2018/0014317 A1* | 1/2018 | Gulati | .................... | H04W 16/14 |
| 2018/0115438 A1* | 4/2018 | Park | .................... | H04W 76/16 |
| 2018/0131483 A1* | 5/2018 | Somichetty | ........... | H04L 5/0012 |
| 2018/0146491 A1* | 5/2018 | Kim | .................... | H04W 24/08 |
| 2018/0220365 A1* | 8/2018 | Fang | .................... | H04W 72/04 |
| 2018/0227011 A1* | 8/2018 | Yerramalli | ............ | H04B 1/7156 |
| 2018/0249461 A1* | 8/2018 | Miao | .................... | H04W 48/16 |
| 2019/0014490 A1* | 1/2019 | Kim | .................... | H04W 24/02 |
| 2019/0021052 A1* | 1/2019 | Kadiri | .................. | H04W 76/28 |

* cited by examiner

| | HOP COUNT | UPLINK THROUGHPUT | CA PCC CH | CA SCC AMOUNT |
|---|---|---|---|---|
| UE 401 | 3 | GOOD | CH 2/4 | 2 |
| | 3 | FAIR | CH 3 | 1 |
| | 3 | POOR | CH 3 | NONE |
| UE 402 | 2 | GOOD | CH 2/4 | 3 |
| | 2 | FAIR | CH 2/4 | 2 |
| | 2 | POOR | CH 3 | 1 |
| UE 403 | 0 | GOOD | CH 1/5 | 5 |
| | 0 | FAIR | CH 2/4 | 3 |
| | 0 | POOR | CH 2/4 | 1 |

US 10,531,457 B1

WIRELESS ACCESS POINT CONTROL OVER CARRIER AGGREGATION (CA) THROUGH A WIRELESS REPEATER CHAIN

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

To expand or enhance the wireless signal coverage of a wireless communication network, repeaters may be added to locations not adequately covered by current network infrastructure. A repeater receives and transmits wireless signals exchanged between UEs and a wireless access point. Without the signal repetition provided by the wireless repeater, the coverage area of the wireless access point may otherwise have not extended far enough to serve the UEs using the repeater.

A wireless communication system may employ Carrier Aggregation (CA). CA allows communication networks to use multiple resource blocks simultaneously for a UE. A UE uses CA to increase data throughput and transmission speeds to a wireless access point. Wireless communication systems can aggregate carriers over various frequency bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands. CA configurations for UEs communicating over repeaters may include a Primary Component Carrier (PCC) to exchange control and signaling data and one or more Secondary Component Carriers (SCCs) to exchange additional user data between the UE and the wireless access point.

Although repeaters are a useful solution to expanding network coverage, each time a wireless repeater repeats a wireless signal a delay is caused. This may cause a ripple effect in which the accumulated delay further down the wireless repeater chain may be significantly high. Therefore, UEs further down the wireless repeater chain may require a different radio frequency band for a CA PCC and a different amount of CA SCCs than a UE not communicating over the wireless repeater chain. Unfortunately, current methods of controlling CA in a wireless repeater chain are neither efficient nor effective.

TECHNICAL OVERVIEW

A wireless access point to control Carrier Aggregation (CA) over a wireless repeater chain. The wireless access point wirelessly exchanges network signaling with User Equipment (UE) over the wireless repeater chain using a number of repeater hops. The wireless access point processes the number of repeater hops to select a radio frequency for a CA Primary Component Carrier (PCC) and to select an amount of CA Secondary Component Carriers (SCCs) for the UE. The wireless access point wirelessly exchanges user data with the UE over the wireless repeater chain using the selected radio frequency for the CA PCC and using the selected amount of the CA SCCs.

DETAILED DESCRIPTION

Figure 1:
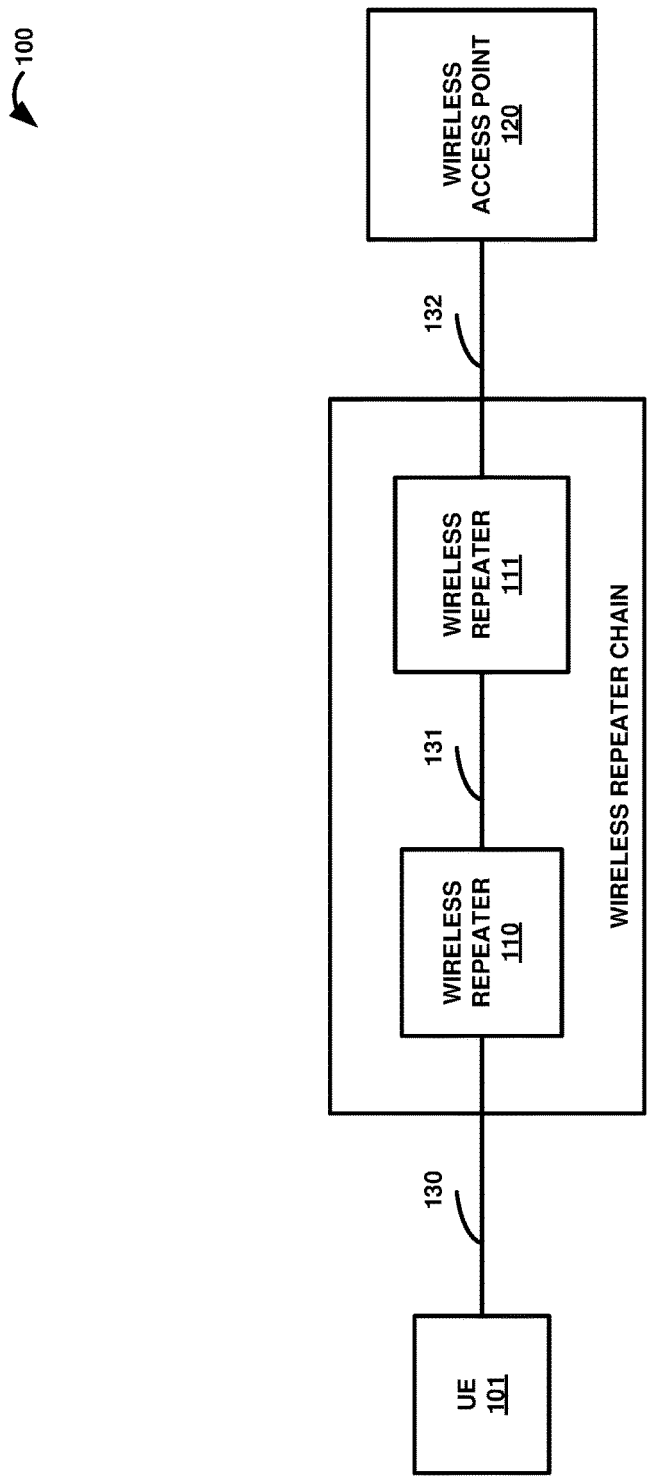
FIGS. 1-3 illustrate a wireless communication system to control Carrier Aggregation (CA) over a wireless repeater chain.
Figure 2:
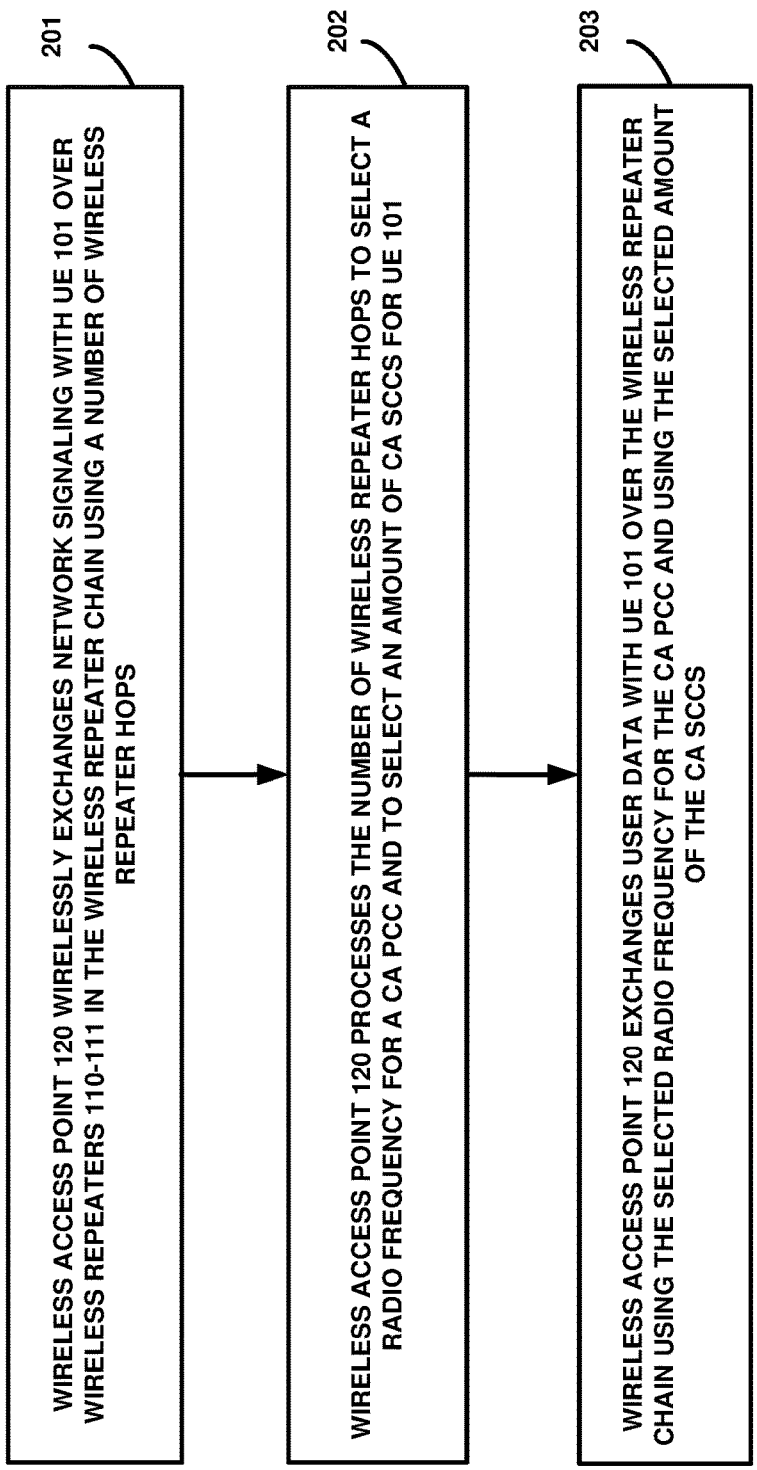
Figure 3:
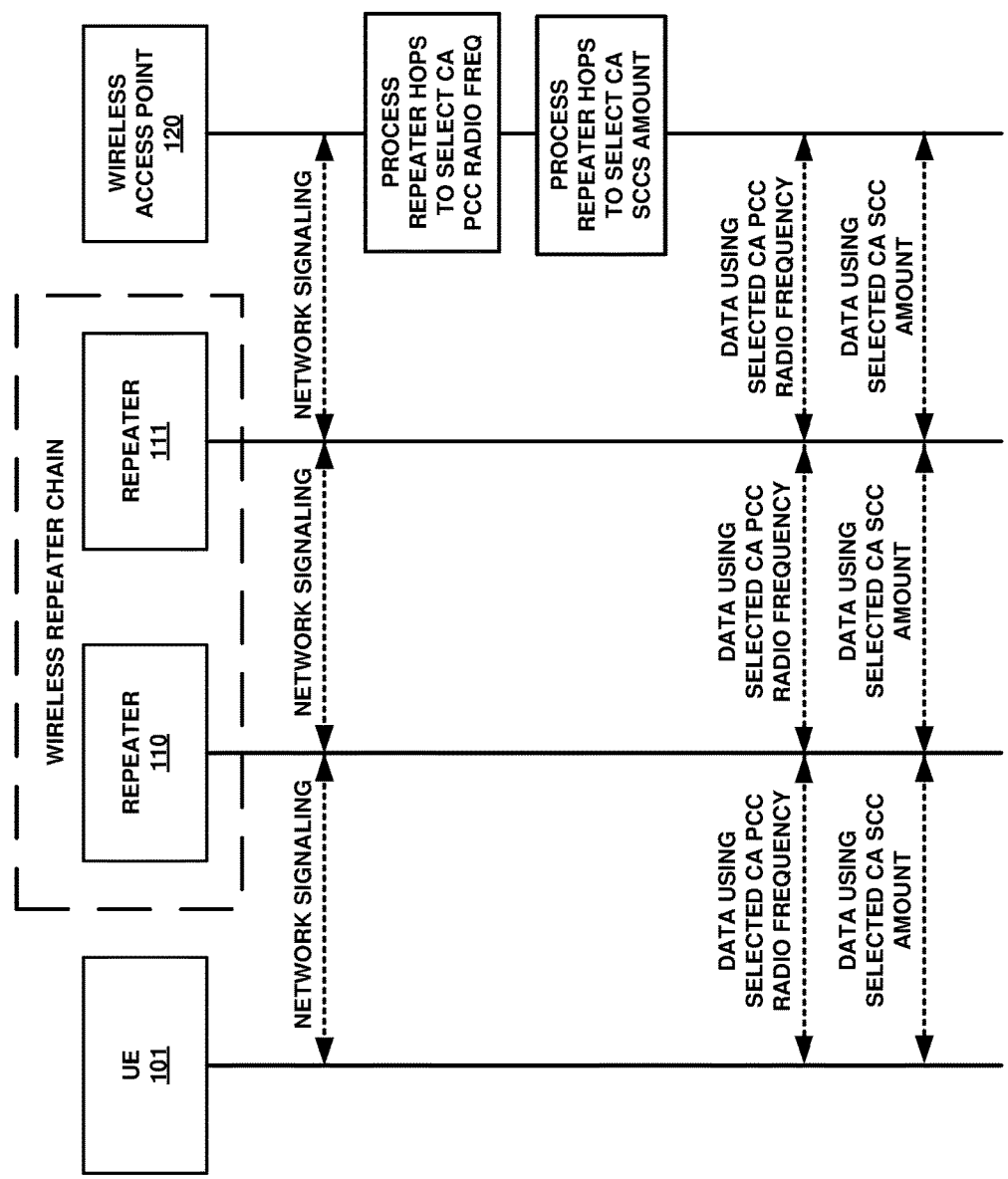

FIGS. 1-3 illustrate wireless communication system 100 to control CA in a wireless repeater chain. Referring to FIG. 1, wireless communication system 100 comprises User Equipment (UE) 101, wireless repeaters 110-111 in the wireless repeater chain, and wireless access point 120. UE 101 communicates with wireless access point 120 over wireless repeaters 110-111 in the wireless repeater chain using wireless communication links 130-132.

UE 101 could be a phone, tablet computer, media device, an intelligent machine, or some other apparatus having a wireless transceiver. UE 101 includes processing circuitry and memory that store and execute various software modules. UE 101 may wirelessly receive and transmit Radio Frequency (RF) signals to wireless access point 120 over wireless repeaters 110-111 in the wireless repeater chain.

Wireless access point 120 may comprise a macro base station, a wireless hotspot, an evolved NodeB (eNodeB), or some other wireless access point that may provide wireless communication services to UE 101 over wireless repeaters 110-111. Wireless access point 120 includes RF communication circuitry, communication interfaces, network interfaces, processing systems, microprocessors, storage systems, storage media, or some other processing devices or software systems, and may be distributed among multiple devices.

Wireless repeaters 101-111 in the wireless repeater chain may each comprise a mini-macro cell, a small cell, or some other wireless base station capable of providing wireless communication services to UE 101 from wireless access point 120. Wireless repeaters 110-111 in this repeater chain each typically include amplifiers, filters, RF modulators, and signal processing circuitry. Wireless repeaters 110-111 may be configured to provide wireless coverage to one or more UEs for voice calls, media streaming, internet access, text messages, and the like. Wireless repeaters 110-111 are capable of receiving and transmitting an RF signal that comprises multiple component frequencies.

Wireless communication links 130-132 use air or space as the transport media. Wireless communication links 130-132 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), LTE, Wireless Fidelity (WIFI), High Speed Packet Access (HSPA), or some other wireless communication format—including combinations thereof.

In operation, wireless access point 120 wirelessly exchanges network signaling with UE 101 over the wireless repeater chain using a number of repeater hops, such as wireless repeaters 110-111. Network signaling may include attachment and registration information to establish signaling between UE 101 and wireless access point 120 over wireless repeaters 110-111.

Wireless access point 120 may determine a number of repeater hops by processing UE or wireless repeater timestamps indicated in the network signaling received from UE 101 and wireless repeaters 110-111. Wireless access point 120 may also determine a number of repeater hops by determining a location of UE 101 and determining a number of wireless repeater hops exchanging network signaling with UE 101 based on the location of UE 101.

In a next operation, wireless access point 120 processes the number of repeater hops to select a radio frequency for a CA Primary Component Carrier (PCC) and to select an amount of CA Secondary Component Carriers (SCCs) for UE 101. CA enables wireless access point 120 to exchange network signaling with UE 101 and other UEs using multiple resource blocks simultaneously. UE 101 uses CA to increase data throughput and transmission speeds to wireless access point 120.

Each aggregated carrier is referred to as a component carrier which may be allocated for an uplink or downlink for UE 101. PCCs include the component carrier scheduled by a primary serving cell which is used to exchange UE control and signaling data. The SCCs include additional component carriers used by UE 101 to exchange additional user data and may be added or removed as needed.

Wireless access point 120 may select the radio frequency for the CA PCC for UE 101 by scheduling the CA PCC on a component carrier with high signal strength, low interference, and low time delay. Wireless access point 120 may process the number of repeater hops to select the radio frequency for the CA PCC for UE 101 by allocating a higher quality CA PCC to UEs served by wireless repeaters 110-111 and located further down the wireless repeater chain.

Wireless access point 120 may process the number of repeater hops to select an amount of SCCs for UE 101 by determining that UE 101 is exchanging network signaling over a number of repeater hops above a repeater hop threshold and responsively disabling the CA SCCs for UE 101. Therefore, wireless access system 120 would disable CA for a UE exchanging network signaling over wireless repeaters further down the wireless repeater chain. The amount of SCCs for UE 101 may be determined on a per UE basis and may be determined using a database based on the repeater hop count and additional UE data, such as uplink measurements.

Wireless access point 120 then wirelessly exchanges user data with UE 101 over the wireless repeaters 110-111 in the wireless repeater chain using the selected radio frequency for the CA PCC and using the selected amount of the CA SCCs. Wireless access point 120 may then provide data communication services to UE 101 over wireless repeaters 110-111, like internet access, voice calls, media streaming, user messaging, among other communication services.

FIG. 2 is a flow diagram illustrating an operation of wireless communication system 100 to control CA over a wireless repeater chain. Wireless access point 120 wirelessly exchanges (201) network signaling with UE 101 over wireless repeaters 110-111 in the wireless repeater chain using a number of repeater hops. Wireless access point 120 processes (202) the number of repeater hops to select a radio frequency for a CA PCC and to select an amount of CA SCCs for UE 101. Wireless access point 120 wirelessly exchanges (203) user data with UE 101 over the wireless repeater chain using the selected radio frequency for the CA PCC and using the selected amount of the CA SCCs.

FIG. 3 is a sequence diagram illustrating an operation of wireless communication system 100. Wireless access point 120 wirelessly exchanges network signaling with UE 101 over wireless repeaters 110-111 in the wireless repeater chain using a number of repeater hops. For example, UE 101 exchanges network signaling with wireless access point 120 over two wireless repeaters, wireless repeater 110 and wireless repeater 111. In this example, wireless access point 120 determines the number of repeater hops by processing the location of UE 101 with respect to the wireless repeater chain.

Wireless access point 120 processes the number of repeater hops to select a radio frequency for a CA PCC and to select an amount of CA SCCs for UE 101. In some examples, wireless access point 120 processes the number of repeater hops to select a radio frequency for the CA PCC based on a Group Delay Variation (GDV) for the radio frequency. GDV is a measurement of inherent delay and combined delay resulting from the signal passed through the repeater chain. A CA PCC may be allocated to UE 101 based on a low GDV region, such as a frequency band, a frequency channel, a frequency sub-carrier, a resource block, a resource block area, a resource element, and the like. Advantageously, this enables UEs further away from wireless access point 120 to exchange signaling and data over a radio frequency with lower GDV.

In some examples, wireless access point 120 may select the radio frequency for the CA PCC based on the GDV for the radio frequency wherein the number of repeater hops have an inverse numerical relationship. For example, a UE exchanging data and signaling over a higher number of repeater hops is allocated a CA PCC with a lower GDV, and vice versa. In other examples, wireless access point 120 may processes the number of repeater hops to select an amount of CA SCCs wherein the amount of CA SCCs and the number of repeater hops have an inverse numerical relationship. For example, a UE exchanging data and signaling over a higher number of repeater hops is allocated a lower amount of CA SCCs, and vice versa.

In some examples, wireless access point 120 monitors uplink measurements and processes the number of repeater hops with the uplink measurements to select the amount of CA SCCs. In other examples, wireless access point 120 monitors uplink throughput and processes the number of repeater hops with the uplink throughput to select the amount of CA SCCs. In other examples, wireless access point 120 monitors average uplink throughput and processes the number of repeater hops with the average uplink throughput to select the amount of CA SCCs.

Wireless access point 120 then wirelessly exchanges user data with UE 101 over the wireless repeaters 110-111 in the wireless repeater chain using the selected radio frequency for the CA PCC and using the selected amount of the CA SCCs. For example, UE 101 exchanges control and signaling data over a CA PCC on a low GDV frequency channel and user data for media streaming over two CA SCCs on high GDV frequencies channels.

Figure 4:
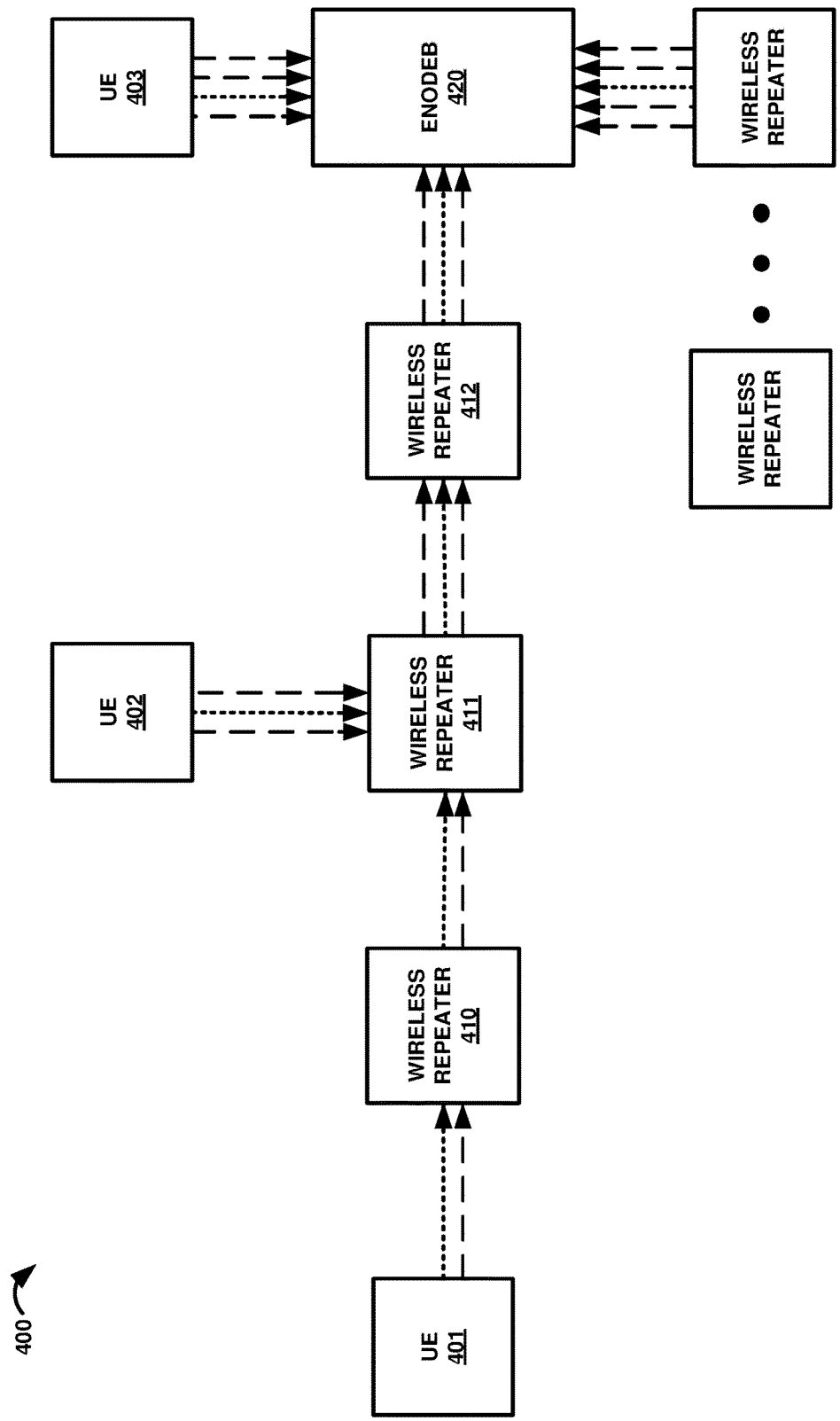
FIGS. 4-6 illustrate a Long Term Evolution (LTE) communication system to control CA over a wireless repeater chain.

FIG. 4 illustrates LTE communication system 400 to control CA over a wireless repeater chain. LTE communication system 400 is an example of wireless communication system 100, although wireless communication system 100 may use alternative configurations and operations. LTE communication system 400 comprises UEs 401-403, wireless repeaters 410-412, and eNodeB 420. LTE communication system 400 also includes additional wireless repeater chains.

As indicated by the dotted lines, UEs 401-403 exchange data and signaling using a CA PCC with eNodeB 420. As indicated by the dashed lines, UEs 401-403 exchange user data over an amount of CA SCCs with eNodeB 420. UE 401 communicates with eNodeB 420 over three wireless repeaters, wireless repeaters 410-412. UE 402 communicates with eNodeB 420 over two wireless repeaters, wireless repeaters 410-411. UE 403 communicates with eNodeB 420 directly without any wireless repeaters.

Figure 5:
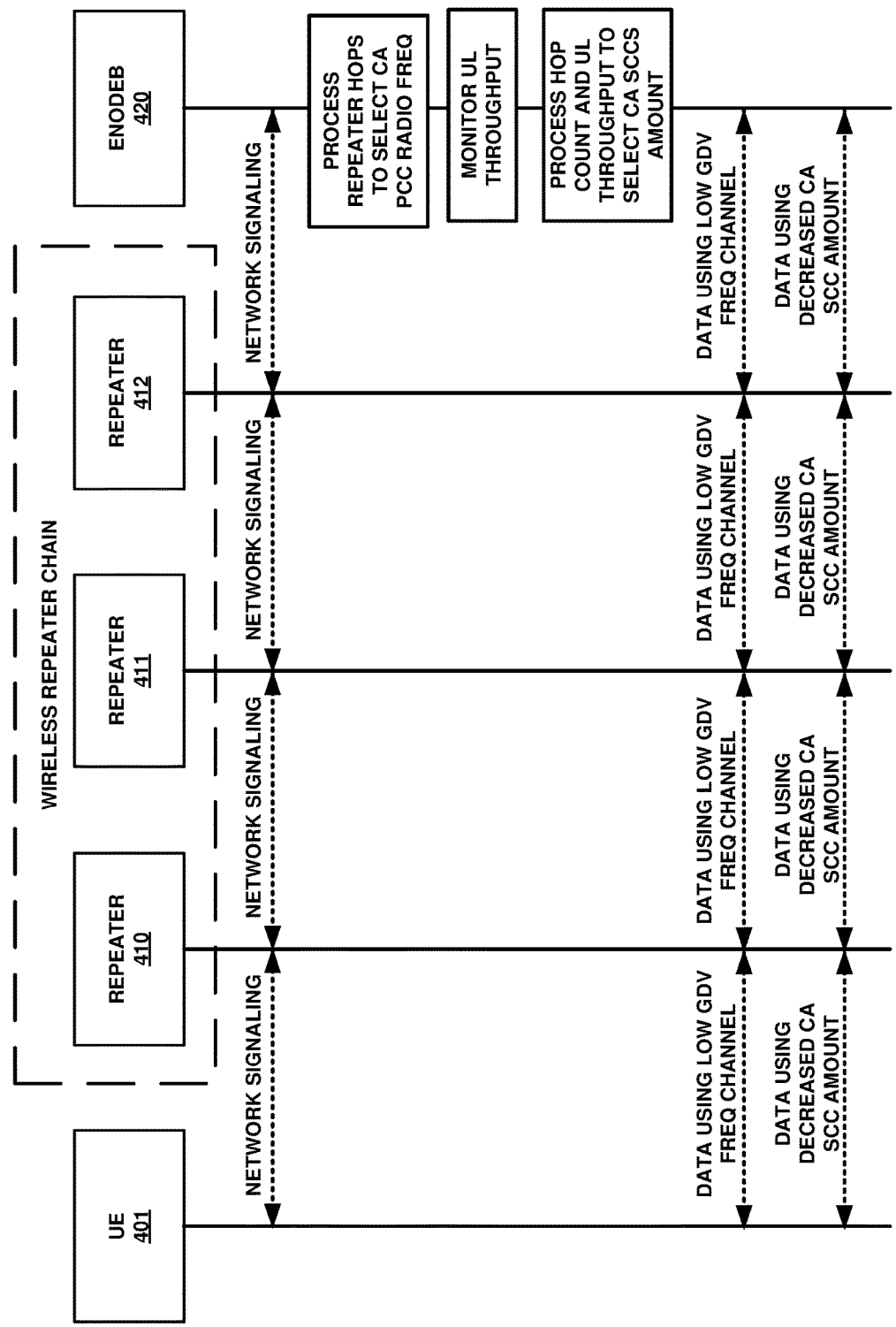

FIG. 5 illustrates an operation of LTE communication system 400 to control CA over a wireless repeater chain. In a first operation, eNodeB 420 wirelessly exchanges network signaling with UE 401 over wireless repeaters 410-412 in the wireless repeater chain using three repeater hops. eNodeB 420 determines the number of repeater hops by processing a wireless repeater timestamp indicated in uplink signaling data received from UE 401. eNodeB 420 then processes the number of repeater hops to select a radio frequency for a CA PCC for UE 401 based on a GDV for the radio frequency.

In this example embodiment, eNodeB 420 also monitors uplink throughput for UE 401 and processes the number of repeater hops with the uplink throughput to select the amount of CA SCCs. eNodeB 420 then wirelessly exchanges signaling with UE 401 over wireless repeaters 410-412 in the wireless repeater chain using the selected radio frequency for the CA PCC based on the low GDV. eNodeB 420 also exchanges additional user data with UE 401 over wireless repeaters 410-412 in the wireless repeater chain using the selected amount of the CA SCCs based on the number of repeater hops and the uplink throughput for UE 401.

Figure 6:
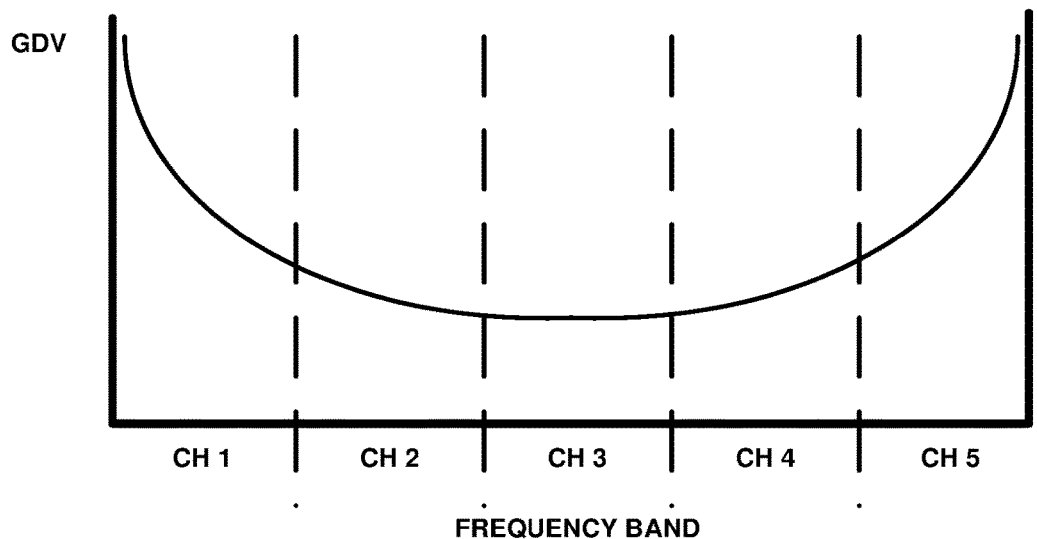

FIG. 6 illustrates a radio frequency band based on GDV and table to control CA over a wireless repeater chain in LTE communication system 400. Referring to the radio frequency band based on GDV, the radio frequency band is separated into 5 channels. As shown by the curved line, the GDV is higher at the radio frequency band edges and lower toward the center region of the radio frequency band. It should be noted that other GDV curves are also possible and that the GDV curve may vary for various radio frequency band. However, for the illustrated radio frequency band, center channel 3 has the lowest GDV, channels 2 and 4 have medium GDV, and edge channels 1 and 5 have high GDV.

Referring next to the table to control CA over the wireless repeater chain, each of UEs 401-403 includes a CA PCC channel allocation and CA SCC amount based on the repeater hop count and uplink throughput wherein the number of repeater hops have an inverse numerical relationship to the selected CA PCC and the amount of CA SCCs. As shown by the individual allocation schemes for each of UEs 401-403, as the number of hops increases, the UE is allocated a lower GDV channel for the CA PCC and a lower CA SCC amount.

For example, UE 401 is exchanging network signaling with wireless repeaters 410-412 and therefore, has a repeater hop count of three. Uplink throughput is also monitored by eNodeB 420 and processed with the repeater hop count to determine that when the uplink throughput is good, UE 401 is allocated a CA PCC in either channel 2 or 4 along with two CA SCCs for additional user data. When the uplink throughput is fair, UE 401 is allocated a CA PCC in channel 3 along with one CA SCC for additional user data. When the uplink throughput is poor, UE 401 is allocated a CA PCC in channel 3 but CA is disabled and therefore, there are no CA SCCs allocated to UE 401.

Figure 7:
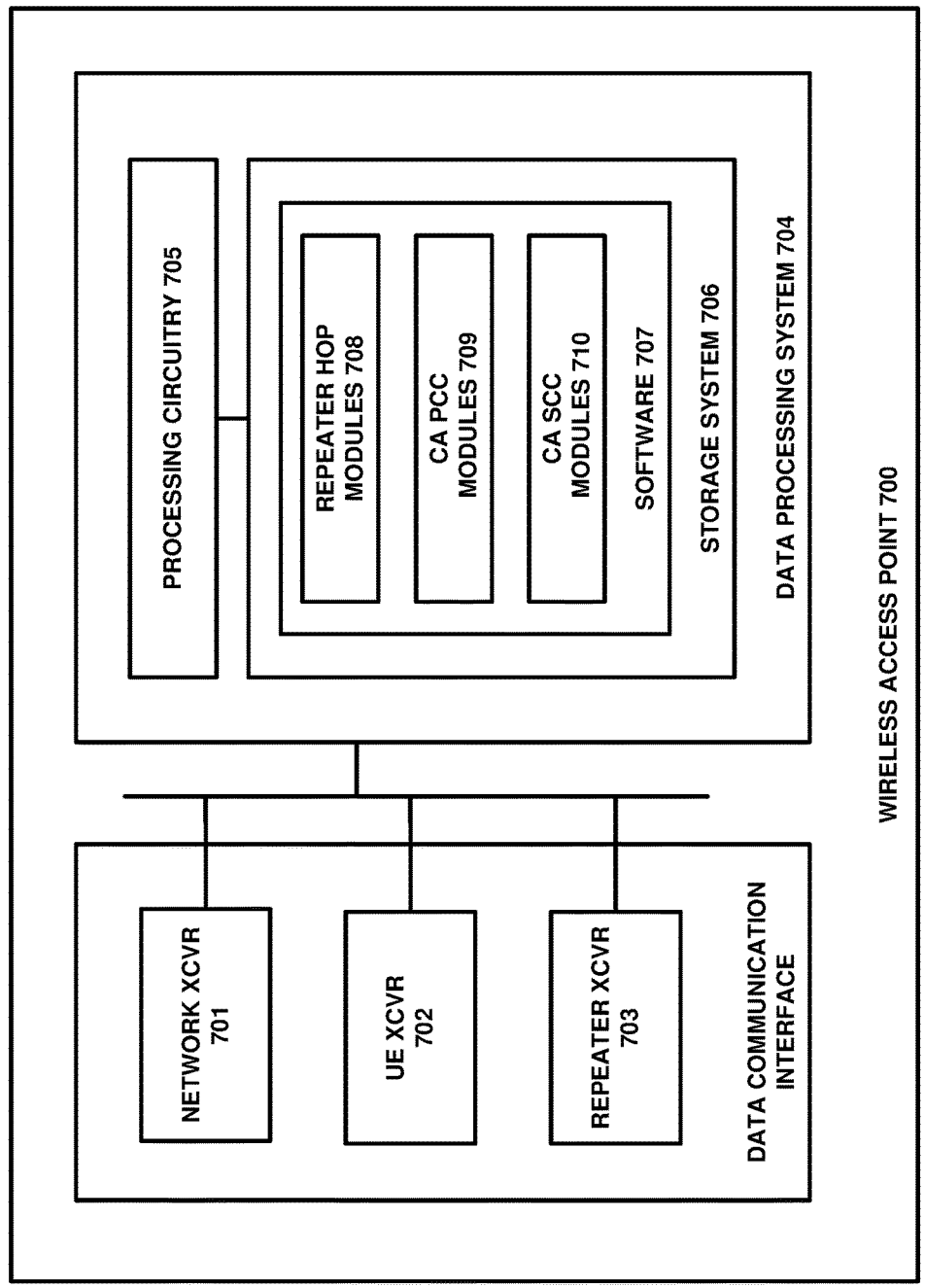
FIG. 7 illustrates a wireless access point to control CA over a wireless repeater chain.

FIG. 7 illustrates wireless access point 700 to control CA over a wireless repeater chain. Wireless access point 700 is an example of wireless access point 120 and eNodeB 420, although wireless access point 120 and eNodeB 420 may use alternative configurations and operations. Wireless access point 700 includes a data communication interface system comprising network transceiver 701, UE transceiver 702, and repeater transceiver 703. Wireless access point 700 also contains data processing system 704. Data processing system 704 is linked to network transceiver 701, UE transceiver 702, and repeater transceiver 703.

Network transceiver 701, UE transceiver 702, and repeater transceiver 703 comprise communication components, such as antennas, ports, amplifiers, filters, modulators, signal processors, and the like. Network transceiver 701 may be configured to use TDM, IP, Ethernet, WDM, SONET, communication signaling, wireless communications, or some other communication format—including improvements thereof. UE transceiver 702 and repeater transceiver 703 may be configured to use LTE, CDMA, OFDMA, LWA, IP, WiFi, or some other wireless communication format—including combinations thereof. Network transceiver 701 may be configured to receive user data from a data communication network. UE transceiver 702 may be configured to transfer user data to a UE using a CA PCC and an amount of CA SCCs. Repeater transceiver 703 may be configured to transfer network signaling and user data to a UE using a CA PCC and an amount of CA SCCs.

Data processing system 704 includes processing circuitry 705 and storage system 706 that stores software 707. Processing circuitry 705 comprises a microprocessor and other circuitry that retrieves and executes software 707 from storage system 706. Storage system 706 comprises a non-transitory storage medium, such as a disk drive, flash drive, data storage circuitry, or some other memory apparatus. Software 707 comprises computer programs, firmware, or some other form of machine-readable processing instructions. Software 707 may further include an operating system, utilities, drivers, network interfaces, applications, or some other type of software. When executed by processing circuitry 705, software 707 directs processing system 704 to operate wireless access point 700 as described herein.

When executed by processing circuitry 705 repeater hop module 708 directs processing circuitry 705 to determine a number of repeater hops in a wireless repeater chain that wireless access point 700 is using to exchange network signaling with a UE. When executed by processing circuitry 705, CA PCC module 709 directs processing circuitry 705 to process the number of repeater hops to select a radio frequency for a CA PCC and exchange user data with a UE over the wireless repeater chain using the selected radio frequency for the CA PCC. When executed by processing circuitry 705, CA SCC module 710 directs processing circuitry 705 to process the number of repeater hops to select an amount of CA SCCs for a UE and exchange user data with a UE over the wireless repeater chain using the selected amount of the CA SCCs.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless access point to control Carrier Aggregation (CA) over a wireless repeater chain, the method comprising:

the wireless access point wirelessly exchanging network signaling with User Equipment (UE) over the wireless repeater chain using a number of repeater hops;

the wireless access point determining the number of repeater hops and a Group Delay Variation (GDV) for one or more radio frequencies;

the wireless access point processing the number of repeater hops and the GDV for the one or more radio frequencies to select a radio frequency for a CA Primary Component Carrier (PCC);

the wireless access point processing the number of repeater hops to select an amount of CA Secondary Component Carriers (SCCs) for the UE; and the wireless access point wirelessly exchanging user data with the UE over the wireless repeater chain using the selected radio frequency for the CA PCC and using the selected amount of the CA SCCs.

2. The method of claim 1 wherein the GDV and the number of repeater hops have an inverse numerical relationship.

3. The method of claim 1 wherein the amount of CA SCCs and the number of repeater hops have an inverse numerical relationship.

4. The method of claim 1 further comprising the wireless access point monitoring uplink measurements and wherein processing the number of repeater hops to select the amount of CA SCCs comprises the wireless access point processing the number of repeater hops and the uplink measurements to select the amount of CA SCCs.

5. The method of claim 1 further comprising the wireless access point monitoring uplink throughput and wherein processing the number of repeater hops to select the amount of CA SCCs comprises the wireless access point processing the number of repeater hops and the uplink throughput to select the amount of CA SCCs.

6. The method of claim 1 further comprising the wireless access point monitoring average UE uplink throughput and wherein processing the number of repeater hops to select the amount of CA SCCs comprises the wireless access point processing the number of repeater hops and the average UE uplink throughput to select the amount of CA SCCs.

7. The method of claim 1 wherein the selected radio frequency for the CA PCC comprises a frequency channel.

8. The method of claim 1 wherein the selected radio frequency for the CA PCC comprises a resource block area.

9. The method of claim 1 wherein the wireless access point comprises an evolved NodeB (eNodeB).

10. A wireless communication system to control Carrier Aggregation (CA) over a wireless repeater chain, the wireless communication system comprising:

a wireless access point configured to wirelessly exchange network signaling with User Equipment (UE) over the wireless repeater chain using a number of repeater hops;

the wireless access point configured to determine the number of repeater hops and a Group Delay Variation (GDV) for one or more radio frequencies;

the wireless access point configured to process the number of repeater hops and the GDV for the one or more radio frequencies to select a radio frequency for a CA Primary Component Carrier (PCC);

the wireless access point processing the number of repeater hops to select an amount of CA Secondary Component Carriers (SCCs) for the UE; and the wireless access point configured to wirelessly exchange user data with the UE over the wireless repeater chain using the selected radio frequency for the CA PCC and using the selected amount of the CA SCCs.

11. The wireless communication system of claim 10 wherein the GDV and the number of repeater hops have an inverse numerical relationship.

12. The wireless communication system of claim 10 wherein the amount of CA SCCs and the number of repeater hops have an inverse numerical relationship.

13. The wireless communication system of claim 10 further comprising the wireless access point configured to monitor uplink measurements and wherein the wireless access point configured to process the number of repeater hops to select the amount of CA SCCs comprises the wireless access point configured to process the number of repeater hops and the uplink measurements to select the amount of CA SCCs.

14. The wireless communication system of claim 10 further comprising the wireless access point configured to monitor uplink throughput and wherein the wireless access point configured to process the number of repeater hops to select the amount of CA SCCs comprises the wireless access point configured to process the number of repeater hops and the uplink throughput to select the amount of CA SCCs.

15. The wireless communication system of claim 10 further comprising the wireless access point configured to monitor average UE uplink throughput and wherein the wireless access point configured to process the number of repeater hops to select the amount of CA SCCs comprises the wireless access point configured to process the number of repeater hops and the average UE uplink throughput to select the amount of CA SCCs.

16. The wireless communication system of claim 10 wherein the selected radio frequency for the CA PCC comprises a frequency channel.

17. The wireless communication system of claim 10 wherein the selected radio frequency for the CA PCC comprises a resource block area.

18. The wireless communication system of claim 10 wherein the wireless access point comprises an evolved NodeB (eNodeB).

* * * * *